United States Patent [19]

Farr

[11] Patent Number: 4,642,031
[45] Date of Patent: Feb. 10, 1987

[54] ALTERNATOR-COMPRESSOR CONSTRUCTION

[75] Inventor: James B. Farr, Ann Arbor, Mich.

[73] Assignee: Tecumseh Products Company, Tecumseh, Mich.

[21] Appl. No.: 736,389

[22] Filed: May 20, 1985

[51] Int. Cl.[4] .................. F04B 21/00; F16D 27/10
[52] U.S. Cl. ............................. 417/223; 192/84 C; 192/110 B
[58] Field of Search ............ 417/223, 319; 192/84 A, 192/84 PM, 84 Z, 84 C, 110 R, 110 B, 114

[56] References Cited

U.S. PATENT DOCUMENTS

| | | | |
|---|---|---|---|
| 1,538,029 | 5/1925 | Detlaff | 192/110 B X |
| 1,539,720 | 5/1925 | Davenport | 192/110 R X |
| 2,091,270 | 8/1937 | Colman | 192/84 C X |
| 2,147,334 | 2/1939 | De Boysson | 417/319 X |
| 2,519,026 | 8/1950 | Cuttat | 192/111 B |
| 2,892,109 | 6/1959 | Gaylor | 310/153 |
| 2,936,054 | 5/1960 | Simon et al. | 192/84 C |
| 3,055,475 | 9/1962 | Pitts | 192/84 C |
| 3,719,260 | 3/1973 | Heidorn | 192/84 C |
| 4,095,922 | 6/1978 | Farr | 417/319 X |
| 4,122,930 | 10/1978 | Bennett et al. | 192/84 C |
| 4,169,360 | 10/1979 | Shimizu | 417/319 |
| 4,187,939 | 2/1980 | Silvestrini et al. | 192/84 C |
| 4,203,710 | 5/1980 | Farr | 417/319 |
| 4,301,906 | 11/1981 | Shirai | 192/84 C |
| 4,425,520 | 1/1984 | Hiraga | 192/84 C |
| 4,428,470 | 1/1984 | Bennett et al. | 192/84 C |

OTHER PUBLICATIONS

*New Ultralightweight*, Bennett and Gaines, 1982 Society of Automobile Engineers, 0148-7191/82/0222-0077.

*Primary Examiner*—Carlton R. Croyle
*Assistant Examiner*—Theodore Olds
*Attorney, Agent, or Firm*—Anthony Niewyk; Albert L. Jeffers

[57] ABSTRACT

A unitary alternator-compressor including a clutch assembly for the compressor. The clutch assembly continuously drives the alternator rotor and selectively drives the compressor crankshaft. A single bearing supports the alternator rotor. The clutch includes a drive pulley and a flange member which is rotatably secured to the rotor by means of a plurality of drive pins. The pins are retained in position by a locking nut which also engages with and clamps the outer race of the bearing. The inner race of the bearing is clamped by a second nut.

14 Claims, 7 Drawing Figures

ALTERNATOR-COMPRESSOR CONSTRUCTION

BACKGROUND OF THE INVENTION

The present invention relates to a combined alternator compressor for providing both the electrical energy generating function and the air conditioning refrigerant pumping function in an automotive vehicle.

Automotive vehicles have customarily included an internal combustion engine as a prime mover which, in addition to supplying energy to propel the vehicle, drives a number of ancillary devices. The engine ordinarily drives an electrical generator or alternator and several pumps including an air conditioner pump or compressor. These devices are driven by way of belts, pulleys and the like.

Typically the alternator and refrigerant compressor will each be driven from the engine crankshaft by way of V-belts and pulleys. The alternator typically revolves at high speed to generate a relatively high frequency alternating voltage. The compressor is typically driven by means of an electromagnetic clutch. Much of the time the electromagnetic clutch is not actuated and the compressor pulley is freewheeling and contributes nothing to the loading of the engine except frictional losses. When the system calls for the compressor to pump refrigerant, the clutch is actuated and causes the compressor pulley to drive the compressor.

One of the problems with the above-described automotive systems is that the utilization of a separate alternator and a separate compressor entails relatively large space and weight requirements. This is undesirable, particularly in today's energy-conscious society where space and weight are at a premium in the automotive environment because of the relatively high cost of energy and the resultant trend towards smaller automobiles. Furthermore, the use of separate alternators and compressors is relatively expensive as it requires the use of a large number of parts.

In some prior art systems the alternator and compressor have been combined into one unit. One example of such a combined alternator compressor unit is disclosed in U.S. Pat. No. 4,095,922, which is assigned to the same assignee as the present application. While the disclosed structure operates satisfactorily, a disadvantage of the structure is that it is relatively complex. Additionally, due to the high rotational velocities at which alternator-compressors operate alignment is critical and has not been easy to achieve with the prior art structures.

Furthermore it is important, due to the stringent space and weight requirements of the automotive environment, that combined compressor alternator units be made as compact and light-weight as possible. Lastly, it is extremely important that magnetic losses in the compressor clutch structure be kept to a minimum to increase efficiency whereby a small clutch field coil can be used for generating the magnetic field for the clutch structure.

It is therefore desired to provide a unitary alternator-compressor which is small, very compact, light-weight and simple in construction.

It is also very desirable that unitary alternator-compressors have a small axial dimension because of the small engine compartments available in automobiles.

Furthermore, it is desired that the parts of an alternator-compressor each perform multiple functions whereby the number of parts required in the prior art structures can be reduced and the structure simplified.

It is still further desired to provide an alternator-compressor wherein alignment of the clutch is relatively simple and easy to achieve and wherein the magnetic losses in the clutch structure of the unit are kept to a minimum.

SUMMARY OF THE INVENTION

The present invention overcomes the disadvantages of the above-described prior art alternator-compressors by providing an improved unitary alternator-compressor including a compressor crankshaft and housing, an alternator rotor, and a compressor clutch drivingly secured to the alternator rotor for selectively engaging the compressor crankshaft.

The present invention still further comprises a unitary alternator-compressor assembly including a compressor crankshaft, compressor housing, and an alternator mounted on the compressor housing. The alternator comprises a base, a stator and a rotor with the rotor including an alternator magnetic flux carrying member and hub. A compressor clutch assembly is provided for continuously driving the alternator rotor and for selectively driving the compressor crankshaft. A single bearing is provided for the alternator. The clutch includes a drive pulley and a flange member which is rotatably secured to the rotor by means of a plurality of drive pins. The pins are retained in position by locking means which also engages the outer race of the bearing.

One advantage of the present invention is the use of fewer parts than prior art alternator-compressor assemblies and the simplicity of construction.

An additional advantage of the present invention is that the alternator-compressor unit is very compact thereby conserving space and weight in the automobile engine compartment.

A further advantage of the present invention is that the clutch structure for the unitary alternator-compressor is very efficient and has very low magnetic losses.

A still further advantage of the present invention is that several of the parts of the unitary alternator compressor perform multiple functions, thereby permitting the elimination of a number of parts of the prior art structures.

Yet another advantage of the present invention is that the clutch is secured to the bearing and alternator rotor assembly in such a way as to give precise pulley and clutch transfer airgap alignment and to further provide high clamping forces on both the inner and outer bearing races for improved structural integrity.

A yet further advantage of the present invention is the use of a single bearing of double row construction for directly mounting the alternator rotor on the bearing to give good control of the system air gaps whereby the system can be operated at high speed without interference between the moving and stationary parts.

Another advantage of the present invention is the transmission of braking torque from the rotating alternator rotor to the clutch pulley, thereby aiding in braking the rotor, as for example if the engine is suddenly stalled from high RPM. The pinned structure would be sufficient to cause belt slip for this sudden deceleration.

Still another advantage of the present invention is that the clutch structure includes negligible air gap joints at the interfaces between the several ferromagnetic parts thereby permitting efficient transmission of clutch magnetic flux.

The present invention, in one form thereof, provides an alternator compressor assembly including a compressor having a crankshaft, an alternator mounted on the compressor and including a stationary base and a rotor. A bearing including inner and outer races is provided, with the inner race mounted on the alternator base and the rotor mounted directly on the outer race. A drive pulley and clutch plate assembly is secured to the rotor for driving the rotor. A stationary clutch coil is disposed between the pulley and rotor for establishing a clutch magnetic flux field. Locking means is associated with the clutch plate for locking the outer bearing race in position.

The instant invention, in one form thereof, further provides a unitary alternator-compressor assembly comprising a compressor including a crankshaft and crankcase and an alternator assembly supported by the crankcase and including a base, a stator, a rotor, and a field magnet assembly. The rotor includes an alternator flux carrying member and a hub. Bearing means is supported on the base and includes inner and outer races, the outer race rotatably supporting the hub. A pulley and clutch assembly and means for drivingly securing the pulley and clutch assembly to the hub are provided. Locking means is secured to the pulley and clutch assembly for retaining the outer race in position.

The invention, in one form thereof, still further provides a unitary alternator-compressor assembly including a compressor having a crankshaft and housing, and an alternator mounted on the housing and comprising a base, a stator and a rotor, the rotor including an alternator flux carrying member and a hub. A clutch assembly is provided for continuously driving the alternator rotor and for selectively driving the crankshaft. The clutch assembly comprises a bearing for rotatably supporting the rotor and a clutch pulley, the bearing including an inner race mounted on the alternator base and an outer race secured to the rotor. A clutch plate is secured to the pulley and has a cylindrical flange member coaxially arranged with the hub, the flange member and hub including aligned apertures. Drive pins are received in the apertures for drivingly securing the rotor to the pulley. Locking means are secured to the clutch plate and engage the outer bearing race for retaining the drive pins in the apertures and the outer bearing race in position.

It is an object of the present invention to provide a unitary alternator-compressor which includes very few parts and is simple in construction.

It is another object of the present invention to provide a unitary alternator-compressor which is small, compact and lightweight.

It is a further object of the present invention to provide a unitary alternator-compressor wherein very low magnetic losses are experienced.

It is a still further object of the present invention to provide a unitary alternator-compressor wherein the parts perform multiple functions.

It is still another object of the present invention to provide a unitary alternator-compressor wherein high clamping forces on the inner and outer bearing races are provided and wherein precise alignment for the clutch transfer airgap is provided by the attachment of the clutch to the bearing and alternator rotor.

Yet another object of the present invention is to provide a unitary alternator-compressor wherein transmission of clutch magnetic flux is accomplished efficiently and wherein negligible air-gap joints exist at the interfaces of the ferromagnetic parts.

Still another object of the present invention is to provide a unitary alternator-compressor wherein a single bearing is used of double row construction with the alternator rotor mounted directly on the bearing for good control of airgaps so that the system can be operated at high speed without interference between moving and stationary parts.

An additional object of the present invention is to provide a unitary alternator-compressor, wherein transmission of the braking force from the rotating rotor to the clutch pulley is provided thereby aiding in decelerating the rotor.

BRIEF DESCRIPTION OF THE DRAWINGS

The above-mentioned and other features and objects of the invention and the manner of obtaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the invention in any manner.

DESCRIPTION OF THE PREFERRED EMBODIMENT

Figure 1:
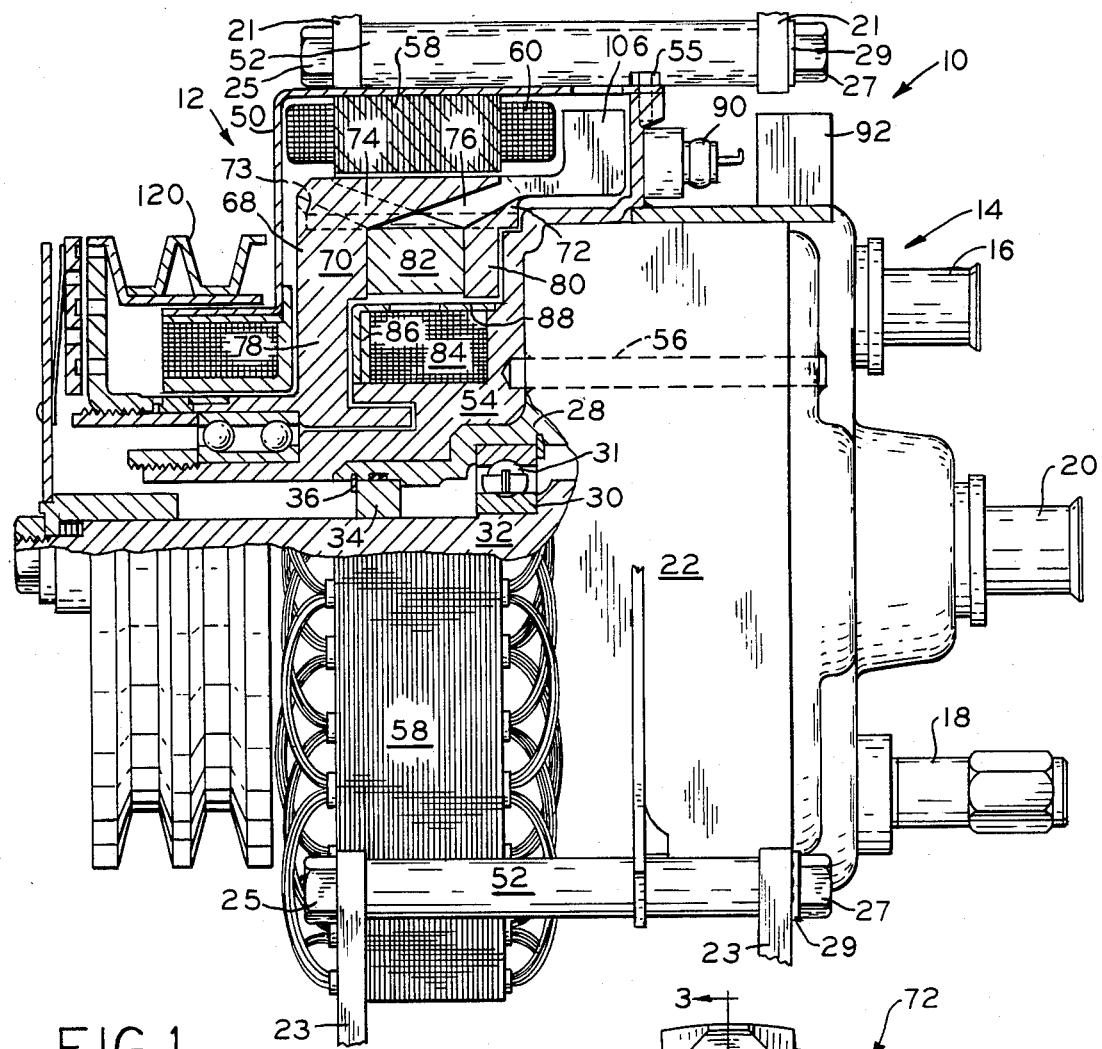
FIG. 1 is an elevational view, partly in cross-section, of the alternator-compressor.

Referring now to FIG. 1 what is shown is an alternator-compressor assembly 10 including a forwardly located alternator section 12 and a rearwardly located compressor section 14. The compressor section includes discharge outlet 16 and suction inlet 20, both of which are connected to refrigeration lines of the vehicle air conditioning system by means of quick connect couplings. Line 18 is provided with a valve for relief of extreme refrigerant pressure.

The compressor section further includes a crankcase 28 preferably constructed of aluminum and a front compressor bearing 30 including bearing balls 31. Bearing 30 journals the compressor crankshaft 32. Rotary seal 34 is provided for sealing compressor crankshaft 32 to compressor crankcase 28. Seal 34 is maintained in position by means of snap ring 36.

The alternator section 12 comprises an alternator housing 50 including alternator-compressor mounting brackets 52, a plurality of which are provided spaced around housing 50 for mounting the alternator-compressor unit in the vehicle engine compartment. Mounting brackets 52 are attached to engine mounting brackets 21 and 23 by means of thru-bolts 25, nuts 27 and lock washers 29. Housing 50 is preferably constructed of a ferromagnetic material such as steel. Stationary alternator base 54, comprised of ferromagnetic material, is provided for supporting the rotating parts of the alternator section 12. Fasteners 55 secure base 54 to housing 50. Weld pins 56 are welded to base 54 for securing base 54 to compressor housing 22.

Figure 2:
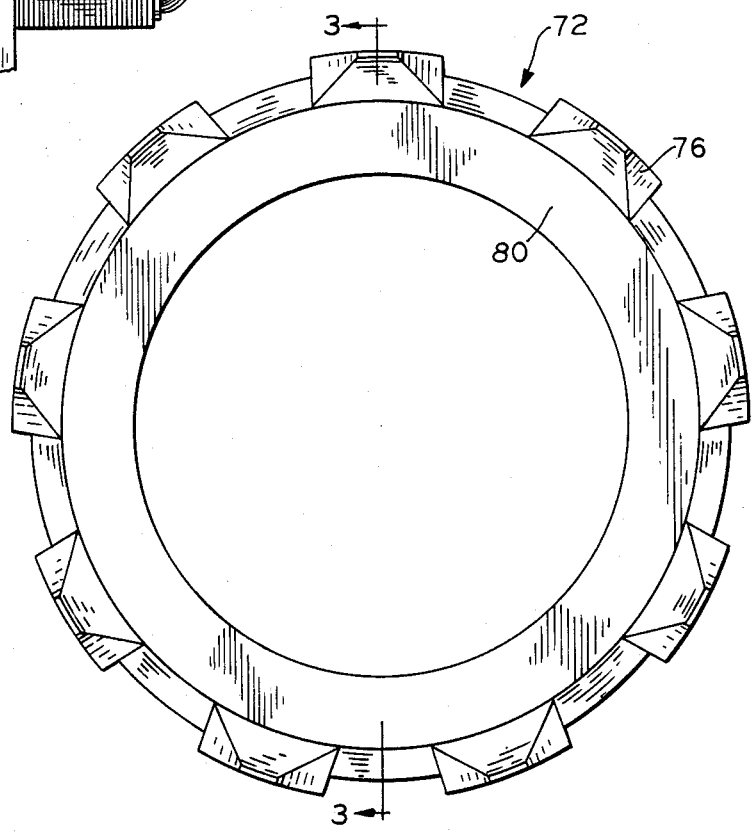
FIG. 2 is an elevational view of the right half of the alternator rotor.
Figure 3:
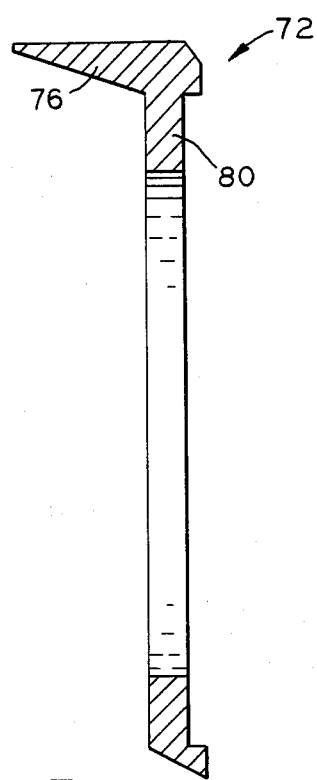
FIG. 3 is a sectional view of the alternator rotor half of FIG. 2 taken along line 3—3.
Figure 4:
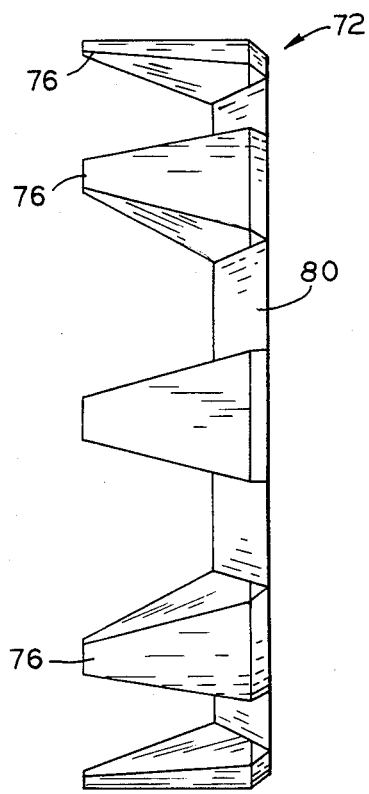
FIG. 4 is a side view of the alternator rotor half of FIG. 2.
Figure 5:
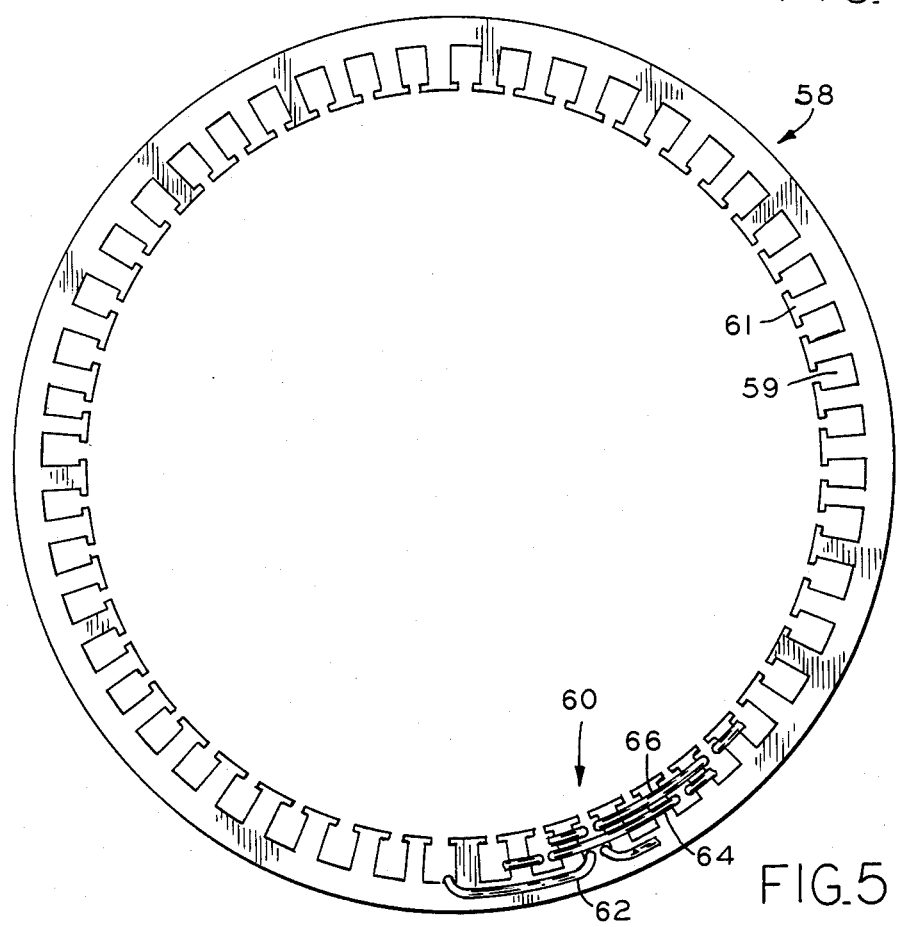
FIG. 5 is an elevational view of the stator lamination stack.

An alternator stator 58 is provided comprising a conventional cylindrical stator lamination stack as further illustrated in FIG. 5. Stator 58 is provided with stator coils 60 as illustrated, the coils comprising three coils 62, 64 and 66 as partially illustrated in FIG. 5. The coils are wound into stator slots 59 formed by stator teeth 61 in overlapping fashion and connected in a Delta arrangement as will be further explained hereinafter. A rotor 68 for the alternator is provided including a front half 70 and rear half 72. Front half 70 and rear half 72 are secured together by means of bolts 73 disposed in throughholes extending from front to back through the rotor halves. Rotor front half 70 includes rotor teeth 74 and rotor rear half section 72 includes rotor teeth 76 as best illustrated in FIGS. 2, 3 and 4. The teeth of the rotor are arranged in alternating fashion around the periphery of the assembled rotor as best shown in FIG. 1, whereby the rotor, as it revolves, will interrupt the magnetic flux field of the alternator to generate a voltage in coils 60.

Rotor front half 70 includes a flange portion 78 and rotor rear half 72 includes a flange portion 80. In the cavity between flanges 78 and 80 are located permanent magnet ring 82 and alternator field coil 84. Permanent magnet ring 82 is secured to rotor 68 and revolves therewith. Alternator field coil 84 is secured to alternator base 54 and is therefore stationary, thereby eliminating the need for brushes to energize the field coil. A steel magnetic path component 86 and ferromagnetic shell 88 are provided adjacent field coil 84 to complete a magnetic path for the alternator field flux. Thus stator 58, permanent magnet ring 82, and alternator field coil 84 form a concentric structure with stator 58 being the outermost element thereof and coil 84 being the innermost element thereof. This concentric structure substantially reduces the front to rear axial dimension of the alternator section as compared with prior art structures thereby resulting in a very compact construction for the alternator-compressor unit. As the rotor rotates the flux generated by the coil and the permanent magnet will traverse the stator and will be cyclically interrupted by the rotor to generate a voltage in stator coils 60 in accordance with Faraday's law. The manner in which the alternator is constructed and operates is more completely set forth in copending U.S. patent application, Ser. No. 736,299 which was filed on the same day as the present application and which is assigned to the same assignee as the present application.

The electric voltage generated in coils 62-66 is rectified in rectifier stack 90 comprising rectifiers 92-102. Voltage regulator 92 controls the voltage applied to alternator field coil 84 whereby the generation of output voltage by the alternator can be controlled.

Figure 7:
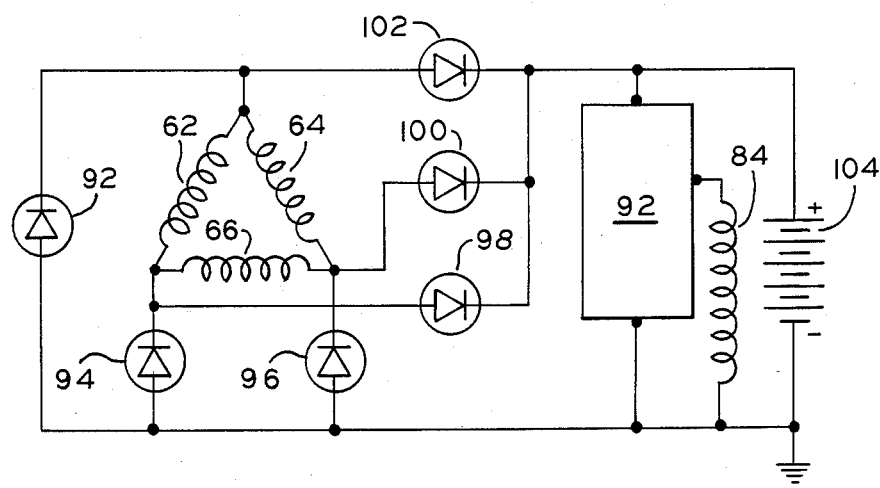
FIG. 7 is a schematic electrical diagram, partially in block form, illustrating an arrangement of the electric circuit for the alternator.

As best seen in FIG. 7 the voltage generated by stator coils 62-66 is rectified by rectifiers 92-102 and is the fed to system battery 104. Voltage regulator circuit 92 is connected in shunt with battery 104 for sensing the voltage generated by stator coils 60 and for controlling the voltage fed to alternator field coil 84.

A fan 106 is secured to alternator rotor rear half 72 by suitable means such as threaded screws. By utilizing the maximum possible diameter for fan 106 good centrifical blower action is achieved. Air is drawn through the relatively open rotor pole pieces and through suitable holes (not shown) circumferentially arranged in the front face of housing 50. Movement of the fan blades past stator winding 60 provides good forced air cooling for the windings.

Figure 6:
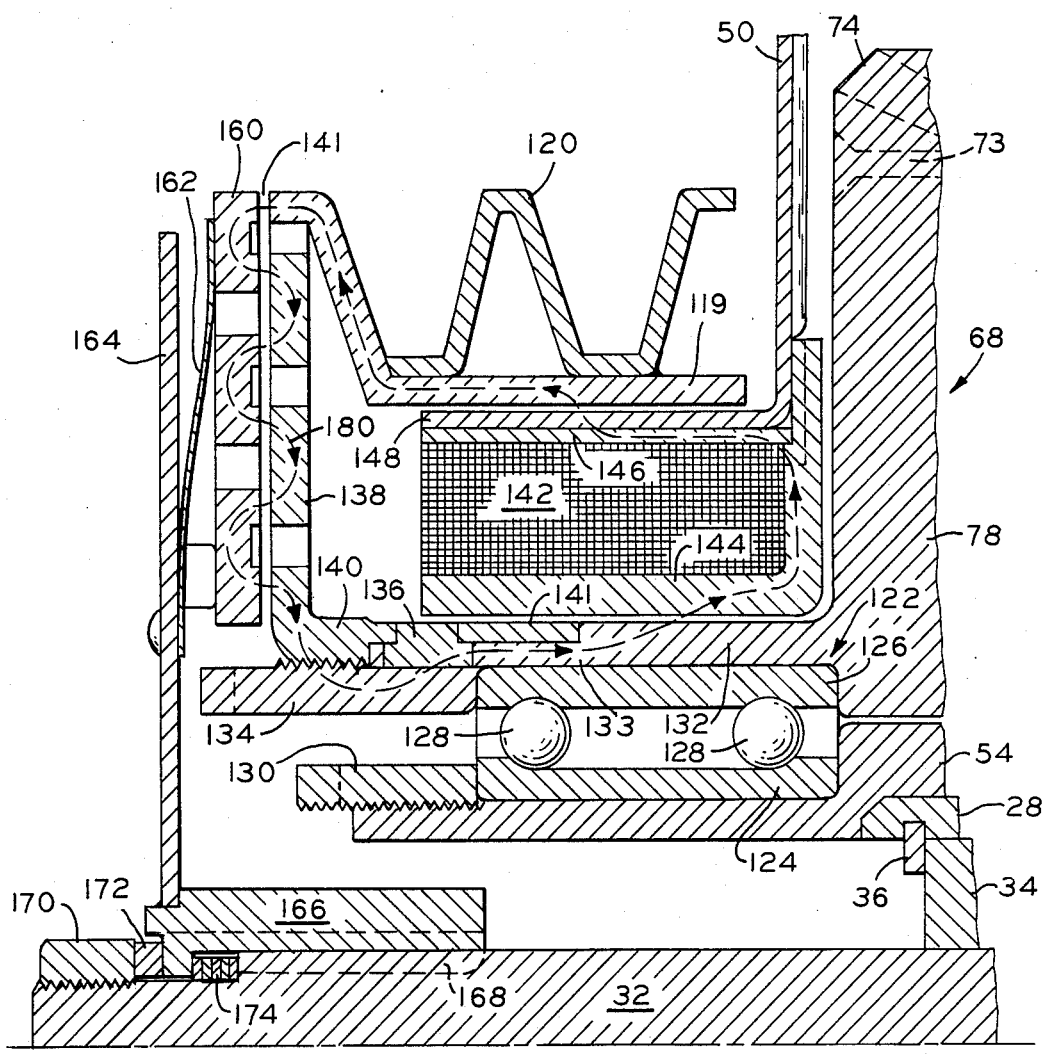
FIG. 6 is a partial enlarged sectional view of the clutch structure of the alternator-compressor of FIG. 1.

Referring now to FIGS. 1 and 6 the clutch and bearing structure for the compressor and alternator includes a double sheave pulley 120. By using a double sheave pulley the diameter of pulley 120 can be made smaller than would be possible if a single sheave pulley were used. This is advantageous for the alternator-compressor unit since space is at a premium in vehicle engine compartments.

Referring further to FIG. 6 a double row ball bearing 122 is shown including an inner race 124 and an outer race 126. Balls 128 are provided in two rows as shown. The inner race 124 is supported on stationary alternator base 54. The rotary outer race 126 supports hub 132 of rotor 68. Hub 132 forms a forwardly extending cylindrical portion of front rotor half section 78. Rotor hub 132 is concentric and coaxial with compressor crankshaft 32. Internally threaded nut 130 clamps inner race 124 tightly onto alternator base 54. Nut 130 is received on base 54 by threaded engagement therewith.

Externally threaded nut 134 clamps outer race 126 of ball bearing 122 tightly onto rotor front half 78. Rotor hub 132 is secured to flange portion 140 of clutch plate 138 by means of pins 136 which are received in aligning apertures in rotor hub 132 and flange 140. Preferably a plurality of pins 136 are provided. By means of nuts 130 and 134 bearing 122 is tightly clamped between rotating rotor 68 and stationary alternator base 54. The clutch structure is thereby mounted to give precise clutch pulley alignment which is necessary due to the high velocities with which the moving parts rotate. Nut 134 performs the functions of locking outer race 126 of bearing 122, retaining and tensioning drive pins 136, and forming a grease shield for clutch working air gap 141. Thus nut 134 performs multiple functions and eliminates several parts used in prior art clutch structures.

Clutch field coil 142 is received between an inner pole piece 144 and an outer pole piece 146 which is secured to a flange portion 148 of alternator housing 50. Clutch armature 160 is spaced from clutch plate 138 by means of clutch working airgap 141. Clutch armature 160 is secured for rotation to clutch torque plate 164 by means of clutch springs 162 three of which are preferably provided. Clutch torque plate 164 is secured to clutch hub 166 as by welding. Clutch hub 166 is secured to crankshaft 32 by means of internally threaded nut 170 which engages with a front threaded portion of crankshaft 32. A lock washer 172 is provided between hub 166 and nut 170 to prevent nut 170 from working loose. Clutch washer stack 174 is provided for axial adjustment of hub 166 with respect to crankshaft 32 whereby the clutch working air gap 141 can be easily adjusted.

In operation when clutch field coil 142 is energized flux generated by coil 142 traverses inner pole piece 144, outer pole piece 146, alternator housing flange 148, pulley 120, plate 138, clutch plate flange 140, nut 134, drive pins 136, and rotor hub 132. Clutch flux loops back and forth between plate 138 and armature 160 as shown by clutch flux line 180.

Plate 138 has a flanged portion 141 which overlaps flanged portion 133 of the alternator rotor. These flanges 141 and 133 are machined to precise slip-fit diameters to assure good concentricity of the pulley 120 with the compressor crankshaft axis and with the axis of bearing 126. This precise radial alignment is also important in maintaining good control over the flux transfer gap between flange 148 and pulley portion 119, so that members 148 and 119 never scrub or operate at excessive gap. The lapped joint between portion 141 and flange 133 described above also forms a major flux conduction path since the air gap at the slip-fit overlap is very small, and the lapped area is relatively large.

Due to the secure engagement of nut 134 with flange 140 and the high clamping forces generated thereby, and due to the alignment provided by overlapping flanges 141 and 133, the airgaps in the structure will be very small thereby causing an efficient magnetic structure and reducing magnetic losses. The magnetic flux in clutch plate 138 draws clutch armature 160 against clutch plate 138 and overcomes the spring forces of springs 162. The frictional engagement of armature 160 with plate 138 causes armature 160 and torque plate 164 to rotate in unison with pulley 120 thereby causing compressor crankshaft 32 to rotate and pump refrigerant for the vehicle refrigeration system. A suitable circuit (not shown) selectively energizes coil 142 when the system calls for compressed refrigerant.

It can also be seen that rotor 68 rotates continuously and therefore causes alternator 12 to continuously generate electrical energy. The output voltage level of alternator 12 depends on the energization of the alternator field coil as explained hereinabove. Thus much of the time the compressor is not operated and the clutch freewheels, thereby preventing unnecessary loading of the engine by the compressor and saving energy. Additionally, the alternator generator only generates the amount of voltage called for by the vehicle system, thereby avoiding wasted energy.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An alternator-compressor assembly comprising:
a compressor including a crankshaft;
an alternator mounted on said compressor and including a stationary base and a rotor, said rotor including a hub member and an alternator member coaxially arranged therewith;
a bearing including inner and outer races, said inner race mounted on said base, said hub member being mounted directly on said outer race;
a drive pulley and clutch plate assembly concentrically arranged with said bearing;
stationary clutch coil means arranged between said drive pulley and said rotor for establishing a clutch magnetic flux field;
locking means connected with said clutch plate for locking said outer bearing race in position; and
drive pin means for drivingly securing said hub member to said drive pulley and clutch plate assembly, said drive pulley and clutch plate assembly and said hub member including aligned apertures for receiving said pin means, said locking means retaining said pin means in said apertures.

2. The alternator-compressor assembly of claim 1 wherein said locking means comprises a nut threadedly engaged with said clutch plate, an outer cylindrical surface of said nut engaging said pin means and preventing radial inward movement thereof.

3. The alternator-compressor assembly of claim 1 including a clutch torque plate and a clutch armature, said torque plate and armature spaced from said clutch plate and secured to said crankshaft for rotatably driving said crankshaft, and means for adjusting the space between said clutch plate and said armature.

4. The alternator-compressor assembly of claim 1 wherein said pins are comprised of magnetic material and wherein the magnetic flux path for said clutch includes said hub member, said locking means, said drive pins, and said drive pulley and clutch plate assembly.

5. A unitary alternator-compressor assembly comprising:
a compressor including a crankshaft and a crankcase;
an alternator assembly supported by said crankcase and including a base, a stator, a rotor, and a field magnet assembly, said rotor including an alternator flux carrying member and a hub;
bearing means supported on said base and including outer and inner races, said outer race rotatably supporting said hub;
a pulley and clutch assembly;
means for drivingly securing said pulley and clutch assembly to said hub and including drive pin means;
locking means secured to said pulley and clutch assembly for retaining said outer race in position; and
said drive pin means comprising a plurality of drive pins which are received in aligned apertures of said hub and pulley and clutch assembly, said pins being radially oriented, said locking means retaining said pins in said apertures.

6. The structure of claim 5 including a clutch excitation coil and a clutch armature means, said armature means drivingly connected to said crankshaft whereby said coil, when energized, causes said armature to be drivingly engaged with said pulley and clutch assembly for driving said crankshaft.

7. The structure of claim 6 wherein the path for magnetic flux generated by said coil includes said hub, said pulley and clutch assembly, said pins and said locking means.

8. The structure of claim 6 wherein said driving connection between said pulley and clutch assembly and said crankshaft is axially adjustable for adjusting the air gap between said armature and said pulley and clutch assembly.

9. In a unitary alternator-compressor assembly, a compressor including a crankshaft and a housing, an alternator mounted on said housing and comprising a base, a stator and a rotor, said rotor including an alternator flux carrying member and a hub, a clutch assembly including a clutch pulley for continuously driving said alternator rotor and for selectively driving said crankshaft and comprising:
bearing means for rotatably supporting said rotor and said clutch pulley, said bearing means including an inner race mounted on the alternator base and an outer race secured to the rotor hub;

clutch plate means secured to said pulley and having a cylindrical flange member coaxially arranged with said hub, said flange member and hub including aligned apertures;

drive pin means received in said apertures for drivingly securing said rotor to said pulley; and locking nut means adjustably secured to said clutch plate for engaging and securing said outer race and said drive pin means, thereby retaining said pin means and outer bearing race in position.

10. The alternator-compressor assembly of claim 9 and including a stationary clutch field coil secured to said base, and interposed between said pulley and hub, the magnetic field flux path for said coil including said hub, said pulley, said clutch plate means and said locking means.

11. The alternator-compressor assembly of claim 9 wherein said pulley is a double sheave pulley.

12. The alternator-compressor assembly of claim 10 wherein said locking means is a grease shield.

13. The alternator compressor of claim 9 wherein said inner race is retained in place by a locking nut threadedly received on said base.

14. The alternator-compressor assembly of claim 9 wherein said drive pin means comprises a plurality of pins made of a magnetic material and radially disposed in said aligned apertures, said magnetic field flux path for said coil including said plurality of pins.

* * * * *